(12) United States Patent
Lehmann Madsen

(10) Patent No.: US 10,953,611 B2
(45) Date of Patent: Mar. 23, 2021

(54) BLADE MOULD FOR MANUFACTURING A BLADE SHELL PART OF A WIND TURBINE BLADE AND RELATED METHOD

(71) Applicant: LM WP PATENT HOLDING A/S, Kolding (DK)

(72) Inventor: Kristian Lehmann Madsen, Fredericia (DK)

(73) Assignee: LM WP PATENT HOLDING A/S, Kolding (DK)

( * ) Notice: Subject to any disclaimer, the term of this patent is extended or adjusted under 35 U.S.C. 154(b) by 64 days.

(21) Appl. No.: 16/307,189

(22) PCT Filed: Jun. 13, 2017

(86) PCT No.: PCT/EP2017/064417
§ 371 (c)(1),
(2) Date: Dec. 5, 2018

(87) PCT Pub. No.: WO2017/216161
PCT Pub. Date: Dec. 21, 2017

(65) Prior Publication Data
US 2019/0126566 A1    May 2, 2019

(30) Foreign Application Priority Data
Jun. 14, 2016  (EP) ..................................... 16174362

(51) Int. Cl.
*B29C 70/34* (2006.01)
*F03D 1/06* (2006.01)
(Continued)

(52) U.S. Cl.
CPC .......... *B29C 70/342* (2013.01); *B29C 33/307* (2013.01); *B29C 33/308* (2013.01);
(Continued)

(58) Field of Classification Search
CPC ... B29C 70/342; B29C 33/307; B29C 33/308; B29D 99/0028; B29D 99/0025;
(Continued)

(56) References Cited

U.S. PATENT DOCUMENTS

2015/0033544 A1*  2/2015  De Waal Malefijt ........................ B25B 11/005
29/559

FOREIGN PATENT DOCUMENTS

CN    201287419 Y  *  8/2009
CN    101695872 A  *  4/2010

OTHER PUBLICATIONS

CN-201287419-Y Machine Translation of Description.*
CN-101695872-A Machine Translation of Description.*

* cited by examiner

*Primary Examiner* — Christopher T Schatz
*Assistant Examiner* — Cynthia L Schaller
(74) *Attorney, Agent, or Firm* — Nath, Goldberg & Meyer; Jerald L. Meyer; Tanya E. Harkins

(57) ABSTRACT

A blade mould and a method for manufacturing a blade shell part of a wind turbine blade is disclosed. The blade mould comprises a first mould frame; a mould shell supported by the first mould frame and provided with a moulding surface that defines an outer shape of the blade shell part, wherein the mould shell has a longitudinal direction and comprises a root end mould part at a first end thereof; and a first deformation device for deforming the root end mould part of the mould shell. The method comprises arranging reinforcement material on the moulding surface of the root end mould part; deforming the root end mould part to a receiving configuration; inserting the root end insert in the root end mould part; and bringing the root end mould part to a moulding configuration.

17 Claims, 6 Drawing Sheets

Figure 1:
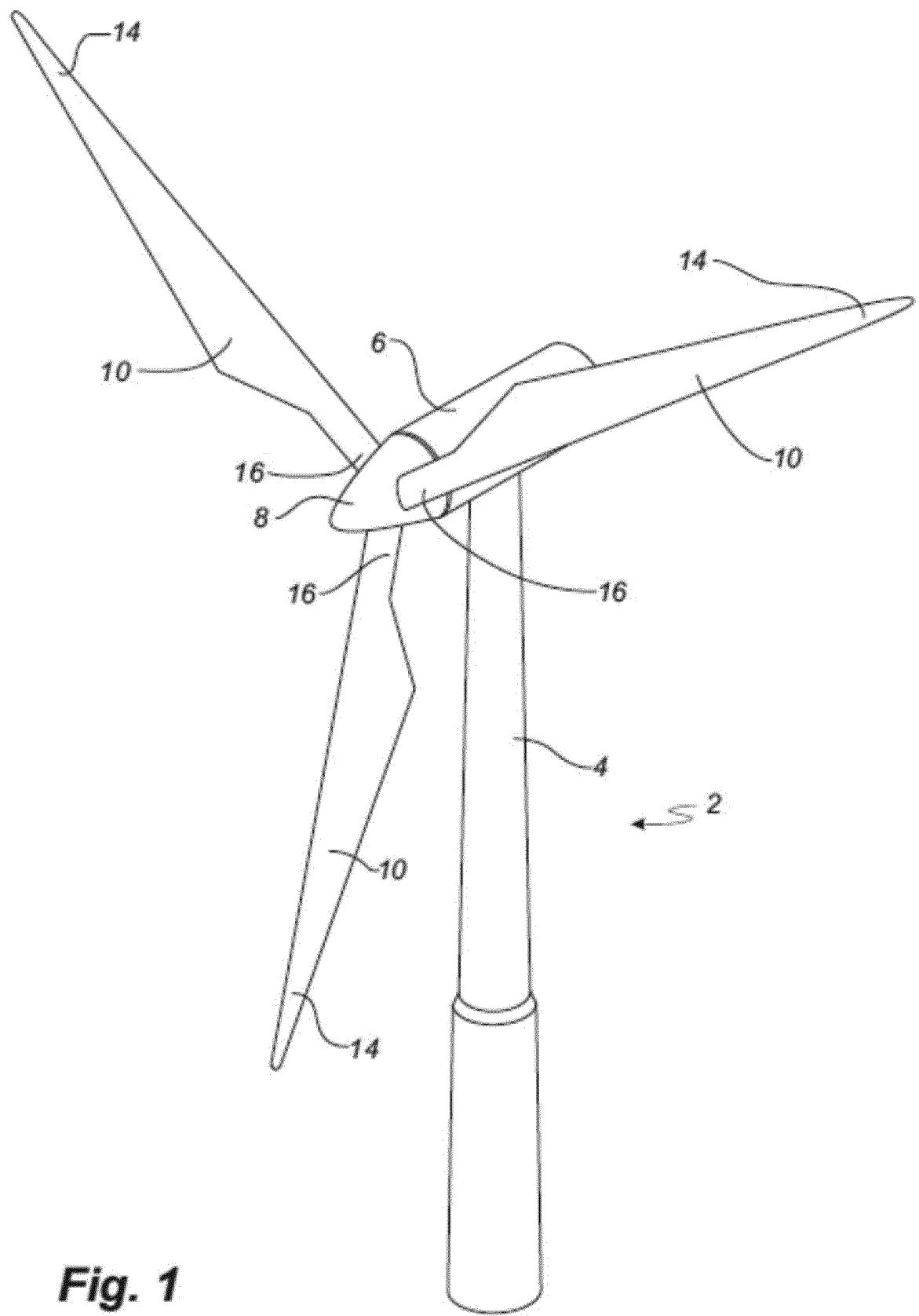

(51) Int. Cl.
*B29C 33/30* (2006.01)
*B29D 99/00* (2010.01)
B29L 31/08 (2006.01)

(52) U.S. Cl.
CPC ..... *B29D 99/0025* (2013.01); *B29D 99/0028* (2013.01); *F03D 1/0633* (2013.01); *F03D 1/0675* (2013.01); *B29L 2031/085* (2013.01); *F05B 2230/21* (2013.01); *F05B 2240/221* (2013.01); *F05B 2240/30* (2013.01); *F05B 2280/6002* (2013.01); *Y02E 10/72* (2013.01); *Y02P 70/50* (2015.11)

(58) Field of Classification Search
CPC .... F03D 1/0633; F03D 1/0675; Y02P 70/523; Y02E 10/721; F05B 2280/6002; F05B 2240/30; F05B 2240/221; F05B 2230/21; B29L 2031/085
See application file for complete search history.

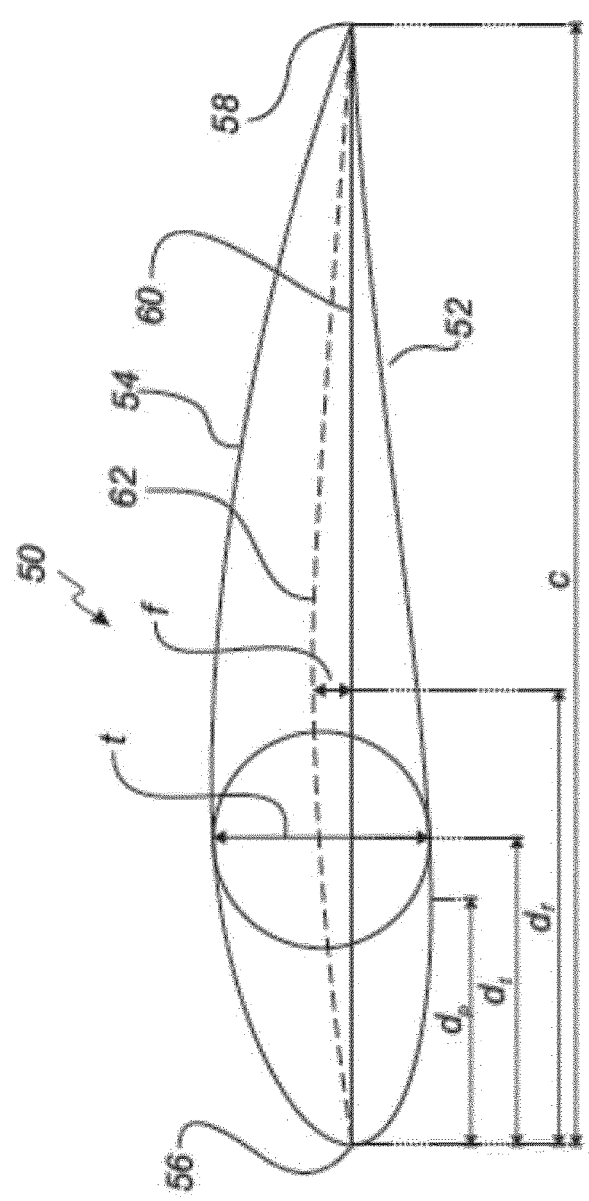
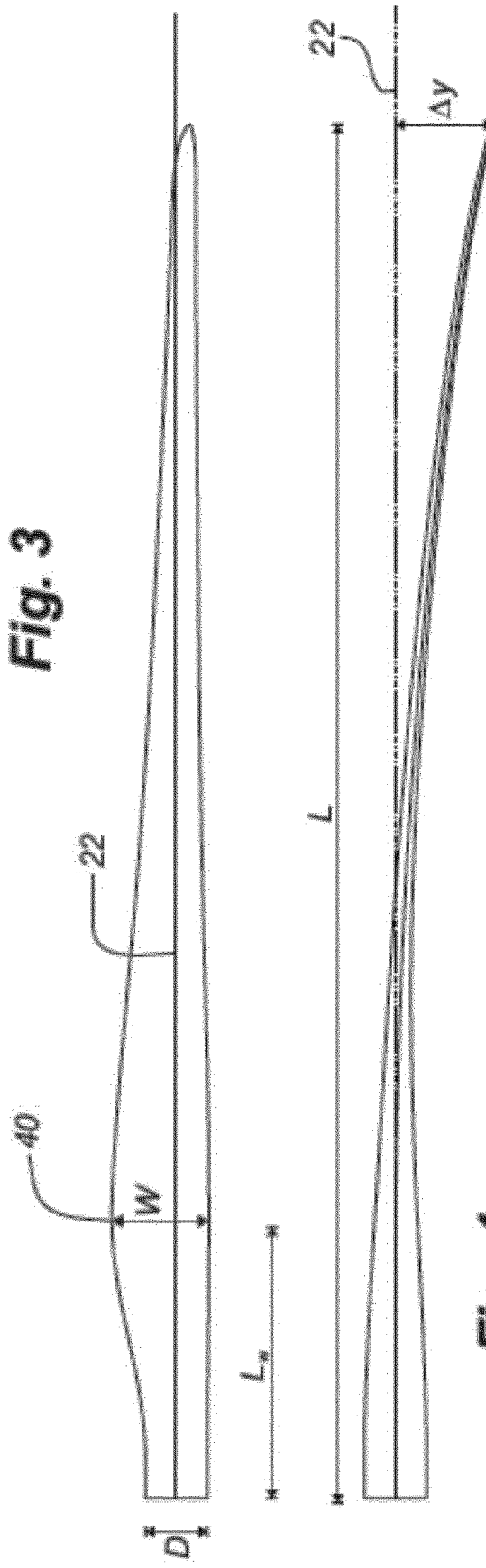
Fig. 3
Fig. 4

BLADE MOULD FOR MANUFACTURING A BLADE SHELL PART OF A WIND TURBINE BLADE AND RELATED METHOD

This is a National Phase Application filed under 35 U.S.C. 371 as a national stage of PCT/EP2017/064417, filed Jun. 13, 2017, an application claiming the benefit of European Application No. 16174362.0, filed Jun. 14, 2016, the content of each of which is hereby incorporated by reference in its entirety.

TECHNICAL FIELD

The present disclosure pertains to the field of manufacturing wind turbine blade parts. In particular, the present disclosure relates to a blade mould for manufacturing a blade shell part of a wind turbine blade and/or a method for manufacturing a blade shell part of a wind turbine blade.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Then, the two halves are glued together, often by means of internal flange parts. Glue is applied to the inner face of the lower blade half before the upper blade half is lowered thereon. Additionally, one or two reinforcing profiles (beams or shear webs) are often attached to the inside of the lower blade half prior to gluing to the upper blade half.

The aerodynamic shell parts are typically made by use of Vacuum Assisted Resin Transfer Moulding (VARTM), where a plurality of fibre mats are arranged on top of a rigid mould parts and possibly also a core material to provide parts having a sandwich structure. When the fibre mats have been stacked and overlapped so as to form the final shape of the wind turbine blade shell part, a flexible vacuum bag is arranged on top of the fibre mats and sealed against the rigid mould part, thereby forming a mould cavity containing the fibre mats. Resin inlets and vacuum outlets are connected to the mould cavity. First the mould cavity is evacuated via the vacuum outlets so as to form an underpressure in the mould cavity, after which a supply of liquid resin is supplied via the resin inlets. The resin is forced into the mould cavity due to the pressure differential and impregnates the fibre material of the fibre mats. When the fibre material has been fully impregnated, the resin is cured in order to form the final composite structure, i.e. the blade shell part.

Wind turbine blades have become increasingly longer of the years and blades having a length of more than 70 metres are now commercially available on the market. This also means that larger moulds have to be used. Due to the large size, it has become increasingly complicated to manufacture blade shell parts without errors, such as formation of wrinkles in the fibre material, which in turn can be detrimental to the mechanical strength of the composite structure and may necessitate that the manufactured wind turbine blade shell part has to be scrapped.

SUMMARY OF THE INVENTION

Accordingly, there is a need for systems and methods that will improve the quality of the blade shell parts of wind turbine blades (or at least decrease the risk of errors occurring).

Accordingly, there is provided a blade mould for manufacturing a blade shell part of a wind turbine blade, the blade shell part extending from a tip end to a root end, wherein the blade mould comprises: a first mould frame; and a mould shell supported by the first mould frame and provided with a moulding surface that defines an outer shape of the blade shell part, wherein the mould shell has a longitudinal direction and comprises a root end mould part at a first end thereof. The blade mould may comprise a deformation assembly/first deformation device for deforming the root end mould part of the mould shell.

Also provided is a method of manufacturing a blade shell part of a wind turbine blade, wherein the blade shell part is manufactured as a composite structure comprising a reinforcement material embedded in a polymer matrix, and wherein the blade shell part is provided with a root end insert that, when manufactured, is accessible from a root end of the blade shell part, and wherein the blade shell part is manufactured in a mould shell provided with a moulding surface that defines an outer shape of the blade shell part, wherein the mould shell has a longitudinal direction and comprises a root end mould part at a first end thereof. The method comprises: arranging reinforcement material on the moulding surface of the root end mould part; deforming the root end mould part, e.g. to a receiving configuration, or bringing the root end mould part to a receiving configuration; inserting the root end insert in the root end mould part; and bringing the root end mould part to a moulding configuration.

The disclosed blade mould and method enable reduced risk of errors in the root region of the blade shell part. In particular, the risk of wrinkles appearing in the fibre layup in the root region is lowered. Advantageously, the blade mould and method provide a desired distribution of reinforcement material/fibre layup in the root region of the blade shell part. Further, the disclosed blade mould and method facilitate positioning and insertion of a root insert in the root region of the blade shell part.

Further, the disclosed blade mould and method allows for a higher fibre weight ratio in the root region of the blade shell part which in turn may enable a root region with improved strength properties.

A blade shell part extends from a root end to a tip end and comprising a root region, a transition region, and an airfoil region. The transition region of the blade shell part comprises a shoulder defining a maximum chord of the blade shell part.

The method and/or systems advantageously relate to manufacture of blade shell parts, e.g. having a blade length of at least 40 metres, or at least 45 metres, or even at least 50 metres. The blade shell parts may be prebent so that, when assembled to a blade and mounted on an upwind configured horizontal wind turbine in a non-loaded state, they will curve forward out of the rotor plane so that the tip to tower clearance is increased. A blade shell part has a tip end and a root end with an inner surface and an outer surface. The inner surface of a blade shell part is a surface that is not exposed to the surroundings when the blade shell part is assembled to a wind turbine blade. The outer surface of a blade shell part is a surface that is exposed to the surroundings when the blade shell part is assembled to a wind turbine blade.

The reinforcement material comprises fibre mats. The fibre mats may comprise any type of reinforcement fibres suitable for reinforcing large composite structures, such as glass fibres, carbon fibres or aramid fibres. The fibre mats may comprise unidirectionally, biaxially, or triaxial oriented fibres or randomly oriented fibres.

The blade mould comprises a frame assembly comprising one or more mould frames including a first mould frame. The mould frames are arranged along the mould shell. The first mould frame may be arranged at the first end of the mould shell, or at least within 2 meters from the first end of the mould shell. The first mould frame and the frame assembly in general supports the mould shell. The first mould frame comprises a first side part, e.g. arranged at the first side of the mould shell. The first mould frame may comprise a second side part, e.g. arranged at the second side of the mould shell.

The mould shell has a longitudinal direction and comprises a root end mould part at a first end thereof. The root end mould part of the mould shell is configured to mould the root region of the blade shell part. The mould shell has a first mould edge and a second mould edge.

The deformation assembly/first deformation device is configured to deform the root end mould part of the mould shell. The first deformation device is configured to increase the mould edge distance between the first mould edge and the second mould edge. For example, the first deformation device may be configured to increase the mould edge distance from a layup configuration to a receiving configuration of the root end mould part. The first deformation device may be configured to decrease the mould edge distance between the first mould edge and the second mould edge. For example, the first deformation device may be configured to decrease the mould edge distance from a receiving configuration to a moulding configuration of the root end mould part. The root end mould part may extend at least from the root end to a root end distance of 1 m from the root end, such as to a root end distance of 1 m or more, e.g. 2 m.

In one or more exemplary blade moulds, the first deformation device is attached to the first side part of the first mould frame.

The moulding surface at the first end may form a part of a substantially half-circular or half-oval root end of the blade shell part.

The blade mould comprises a deformation assembly for deforming the mould shell prior to arranging a root insert in the blade mould. The blade mould/deformation assembly comprises one or more deformation devices including the first deformation device. Deformation device(s) of the blade mould is/are configured to deform the root end mould part of the mould shell, e.g. by increasing the mould edge distance. The mould edge distance may be measured at the first end of the mould shell or at a distance of 50 cm from the first end of the mould shell. The first deformation device may be attached to the mould shell at a distance less than 2 meters from the first end of the mould shell. In particular, the first deformation device may be attached to a first side of the mould shell, e.g. at a distance less than 1 meter from the first end of the mould shell. Thereby, deformation of the root end mould part may be facilitated by use of a deformation device with reduced dynamic load capabilities.

In one or more exemplary blade moulds, the first deformation device may be attached to the mould shell at a distance less than 3 meters, such as less than 1 meter from the first end of the mould shell, such as at the first end, about 10 cm, about 20 cm or about 50 cm from the first end. Typically, the root insert has a length from 0.5 to 1.5 meters, such as about 1 meter.

A deformation device, such as the first deformation device and/or a second deformation device, may comprise an actuator selected from a telescopic piston cylinder, such as a hydraulic or pneumatic piston, and an electric actuator.

A deformation device, such as the first deformation device and/or a second deformation device, may comprise a first part and a second part movable in relation to the first part. The first deformation device may comprise a first part anchored to the first mould frame and/or a second part anchored to the mould shell, e.g. to the first side of the mould shell. The first part may be fixed during deformation of the mould shell and/or the second part may move or be configured to move during deformation of the mould shell. The first part may be anchored to a floor or wall of a factory building and the second part may be anchored to the first mould frame, e.g. in order to deform the blade mould and thus the root end mould part.

In one or more exemplary blade moulds, the first deformation device may be attached to a second side of the mould shell. Thereby, a simple blade mould having a single deformation device is provided for.

The blade mould may comprise a second deformation device for deforming the root end mould part of the mould shell. The second deformation device may be attached to the mould shell at a distance less than 2 meters from the first end of the mould shell. In particular, the second deformation device may be attached to a second side of the mould shell, e.g. at a distance less than 1 meter from the first end of the mould shell. A plurality of deformation devices may facilitate improved control of mould shell deformation. In particular, first and second deformation devices arranged to move respective first and second mould edges independently, enables an operator to take into account variating deformation properties of the mould shell. For example, the first side of the mould shell may require a different force for deformation than the second side of the mould shell.

The second deformation device may be attached to the second side part of the first mould frame. The second deformation device may comprise a first part anchored to the first mould frame, e.g. to a second side part of the first mould frame, and/or a second part anchored to the mould shell, e.g. to the second side of the mould shell. The first part may be fixed during deformation of the mould shell and/or the second part may move or be configured to move during deformation of the mould shell.

In one or more exemplary blade moulds, the second deformation device may be attached to the mould shell at a distance less than 3 meters, such as less than 1 meter from the first end of the mould shell, such as at the first end or about 50 cm from the first end.

The first deformation device may have a first travelling distance D1 of at least 5 mm, such as at least 10 mm, at least 20 mm, or at least 30 mm to allow sufficient deformation of the root end mould part.

The second deformation device may have a second travelling distance D2 of at least 5 mm, such as at least 10 mm, at least 20 mm, or at least 30 mm to allow sufficient deformation of the root end mould part.

In one or more exemplary blade moulds, the deformation assembly may comprise a cable system attached to deformation device(s) and the mould shell, the cable system enabling deformation of the root end mould part of the mould shell.

The mould edge distance between the first mould edge and the second mould edge is also denoted $D_{edge}$. The mould edge distance between the first mould edge and the second mould edge in the first or layup configuration is also denoted $D_{layup}$. Thus, in the layup configuration, $D_{edge}=D_{layup}$. The mould edge distance between the first mould edge and the second mould edge in the second or receiving configuration is also denoted $D_{receive}$. Thus, in the receiving configuration, $D_{edge}=D_{receive}$. The mould edge distance between the first mould edge and the second mould edge in the third or moulding configuration is also denoted $D_{mould}$. Thus, in the moulding configuration, $D_{edge}=D_{mould}$. The mould edge distance in the receiving configuration may be larger than the mould edge distance in the layup configuration. The mould edge distance in the receiving configuration may be larger than the mould edge distance in the mould configuration. The mould edge distance in the layup configuration may be the same as the mould edge distance in the mould configuration.

In one or more exemplary blade moulds, the difference between the mould edge distance in the receiving configuration and in the moulding configuration of the root end mould part is larger than 20 mm, such as larger than 40 mm. Accordingly in one or more exemplary blade moulds, $D_{receive}-D_{mould}>40$ mm. Mould edge distance relationships for exemplary blade moulds A-E are outlined in Table 1 below.

|  | A | B | C | D | E |
| --- | --- | --- | --- | --- | --- |
| $D_{receive}-D_{layup}$ | 50 mm | 0 | >20 mm | >80 mm | >30 mm |
| $D_{receive}-D_{mould}$ | 50 mm | >50 mm | >40 mm | >60 mm | >30 mm |

The method comprises arranging reinforcement material on the moulding surface of the root end mould part, e.g. with the root end mould part in a layup configuration. The layup configuration may correspond to the moulding configuration in turn enabling improved control of the fibre distribution in the final blade shell part.

The method comprises deforming the root end mould part to a receiving configuration. Deforming the root end mould part to a receiving configuration may comprise increasing or decreasing a mould edge distance between a first mould edge and a second mould edge of the mould shell, e.g. with at least 40 mm. Increasing the mould edge distance between the first mould edge and the second mould edge of the mould shell may comprise pulling the first mould edge and/or the second mould edge.

The method comprises inserting the root end insert in the root end mould part, e.g. with the root end mould part in the receiving configuration.

The method comprises bringing the root end mould part to a moulding configuration. Bringing the root end mould part to a moulding configuration may comprise reducing a mould edge distance, e.g. with at least 40 mm, between a first mould edge and a second mould edge of the mould shell.

DETAILED DESCRIPTION

Figure 2:
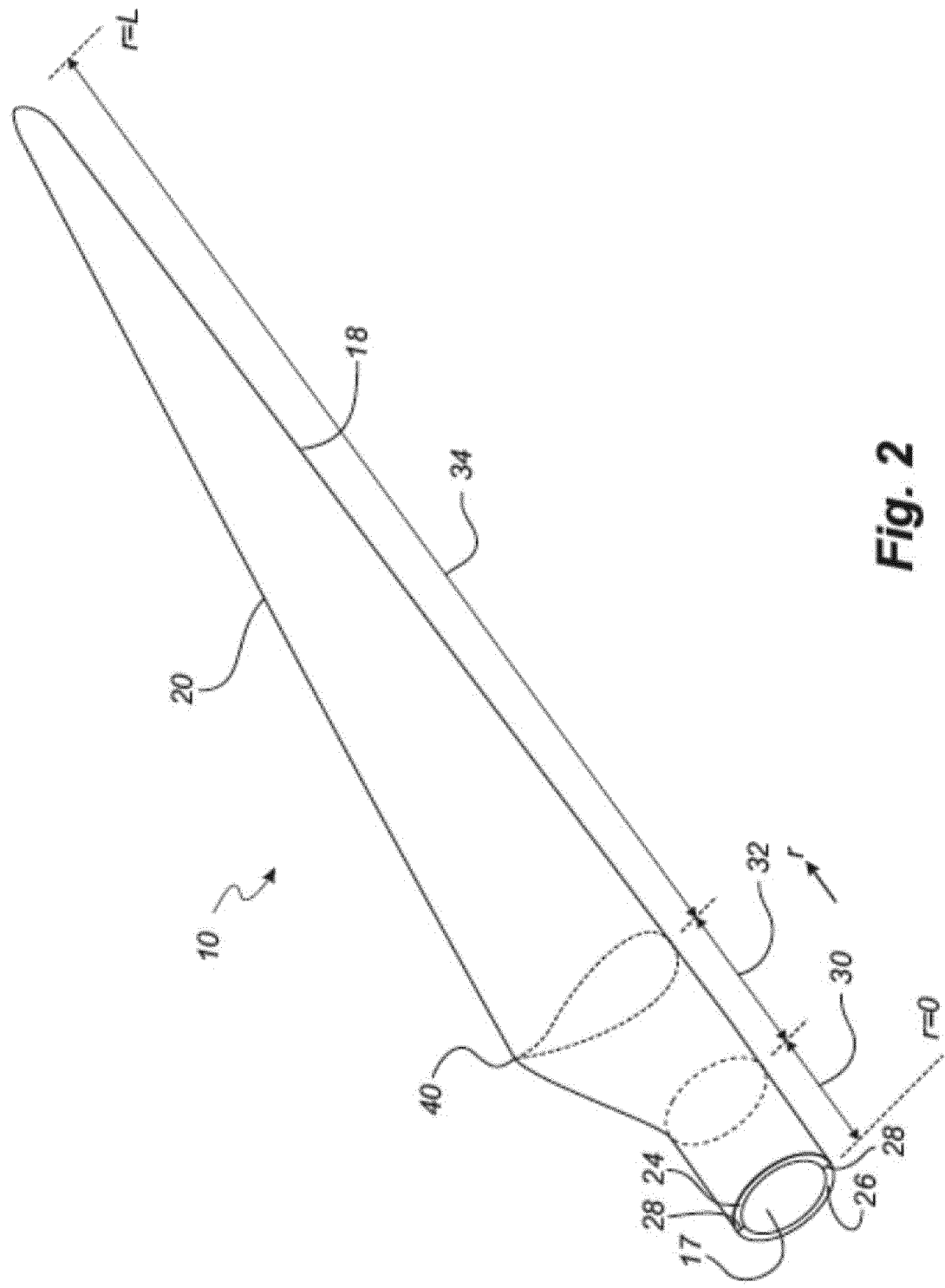
Figure 7:
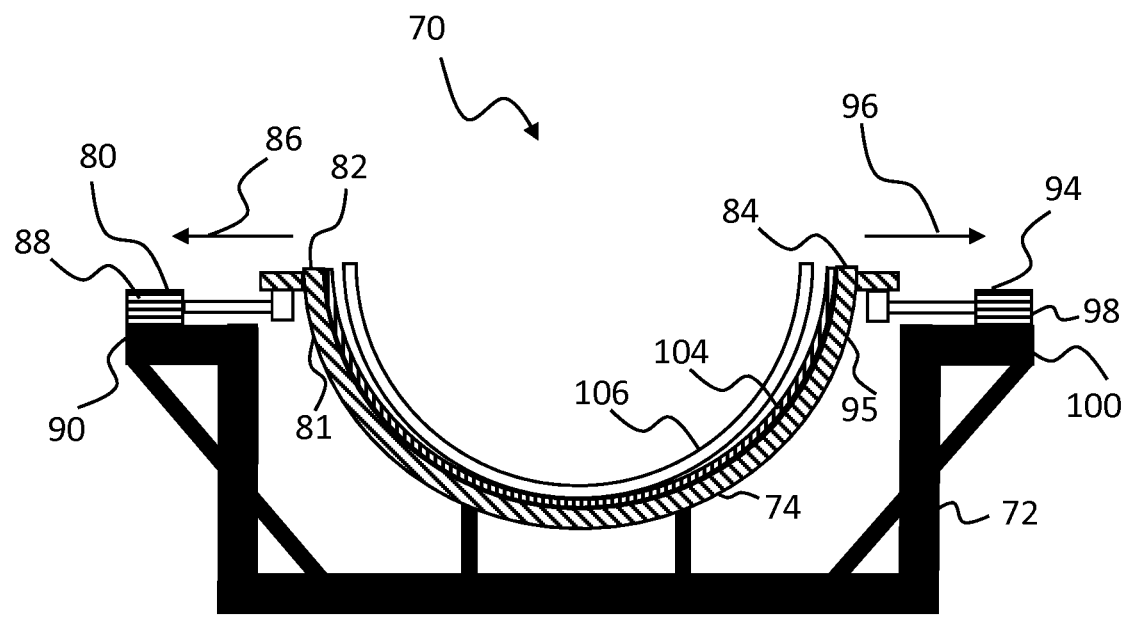
Figure 8:
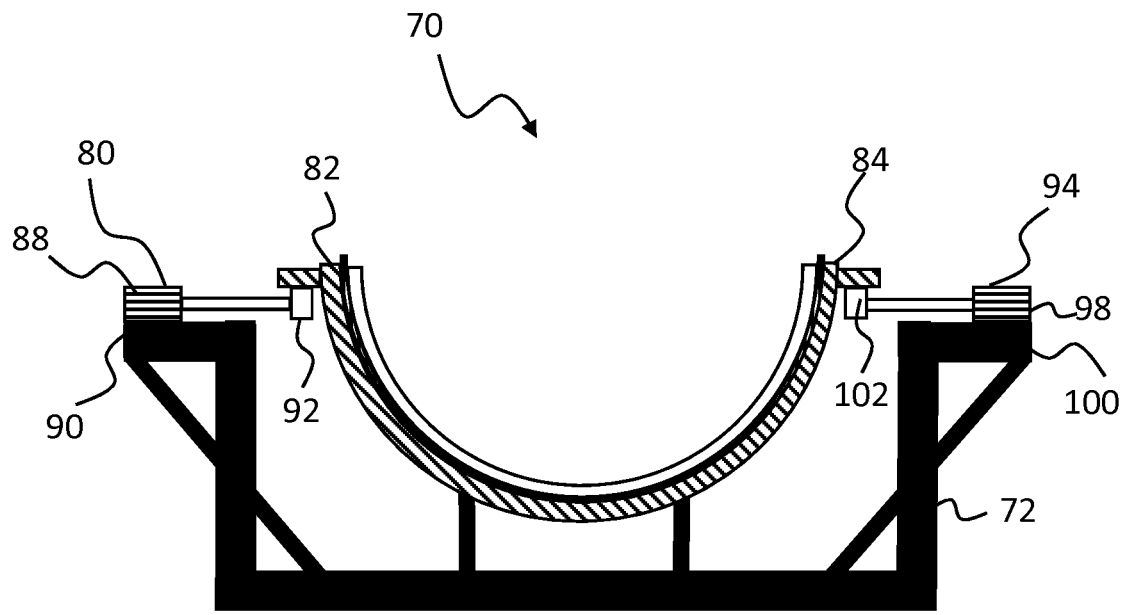
Figure 9:
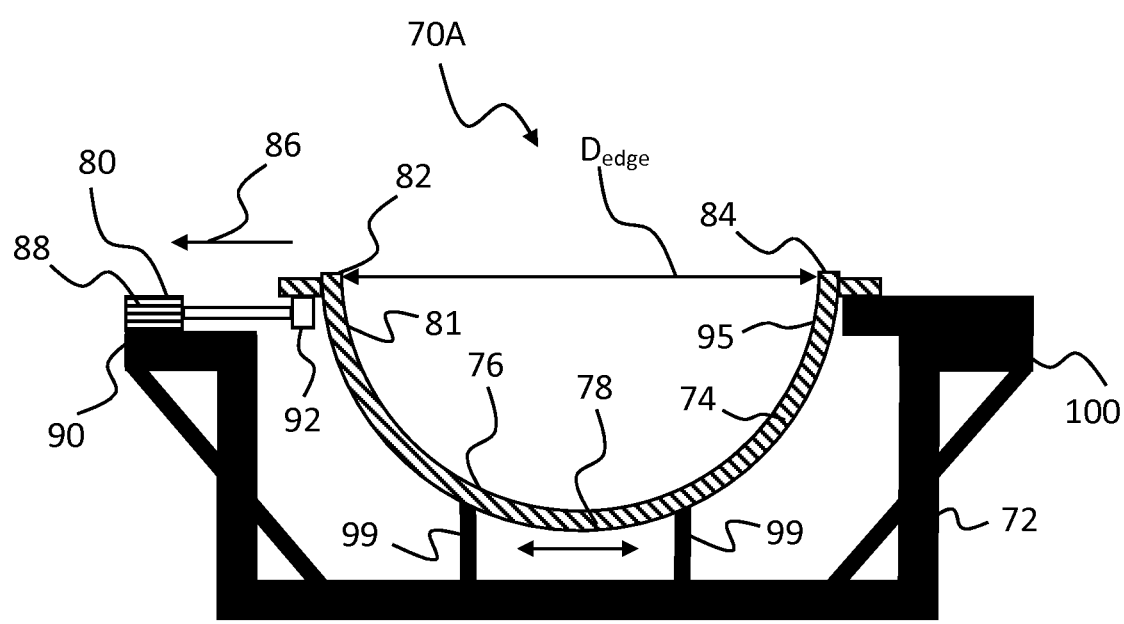

The invention is explained in detail below with reference to the drawings, in which FIG. 1 shows a wind turbine, FIG. 2 shows a schematic view of a wind turbine blade, FIG. 3 shows a schematic view of an airfoil profile, FIG. 4 shows a schematic view of a wind turbine blade, seen from above and from the side, and FIGS. 5-8 show a schematic end view of an exemplary blade mould according to the invention in different configurations, and FIG. 9 shows a schematic end view of an exemplary blade mould according to the invention.

The present invention relates to manufacture of blade shell parts of wind turbine blades for horizontal axis wind turbines (HAWTs).

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell comprising two blade shell parts made of fibre-reinforced polymer and is typically made as a pressure side or upwind blade shell part 24 and a suction side or downwind blade shell part 26 that are glued together along bond lines 28 extending along the trailing edge 20 and the leading edge 18 of the blade 10. Typically, the root ends of the blade shell parts 24, 26 has a semi-circular or semi-oval outer cross-sectional shape.

FIGS. 3 and 4 depict parameters, which may be used to explain the geometry of blade shell parts to be manufactured according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade and blade shell parts. The blade and blade shell parts have a total blade length L. As shown in FIG. 3, the root end is located at position r=0, and the tip end located at r=L. The shoulder 40 of the blade shell parts is located at a position r=$L_w$, and has a shoulder width W, which equals the chord length at the shoulder 40. The diameter of the root is defined as X. Further, the blade/blade shell parts is provided with a prebend, which is defined as Δy, which corresponds to the out of plane deflection from a pitch axis 22 of the blade.

Blades have over the time become longer and longer and may now exceed a length of 70 metres. Further, the root diameter of blades has increased. The length of the blade, the root diameter as well as the shape of the blades with respect to shoulder, twist and prebending makes it increasingly difficult to manufacture the blades.

Figure 5:
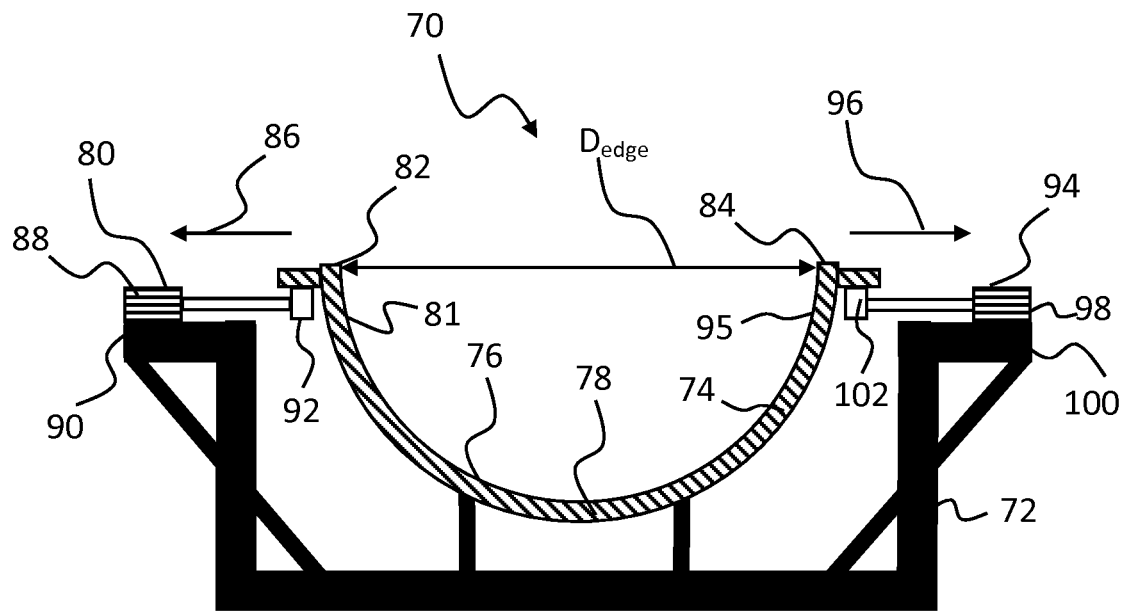

FIG. 5 shows a schematic end view of a blade mould for manufacturing a blade shell part of a wind turbine blade, the blade shell part extending from a tip end to a root end. The blade mould 70 comprises a first mould frame 72 and a mould shell 74 supported by the first mould frame 72 and provided with a moulding surface 76 that defines an outer shape of the blade shell part moulded by the blade mould. The mould shell 74 has a longitudinal direction and comprises a root end mould part 78 at a first end thereof. The moulding surface 76 at the first end forms a part of a substantially half-circular root end of the blade shell part. The blade mould in FIG. 5 is shown in a layup configuration.

The blade mould 70 comprises a deformation assembly for deforming the mould shell prior to arranging a root insert in the blade mould. The blade mould/deformation assembly comprises a first deformation device 80 attached to a first side 81 of the mould shell 74 within 0.5 m from the first end of the mould shell for deforming the root end mould part 78 of the mould shell 74. The mould shell 74 has a first mould edge 82 and a second mould edge 84 with a mould edge distance $D_{edge}$ between the first mould edge 82 and the second mould edge 84. In the layup configuration, the mould edge distance $D_{edge}$ is set to a layup edge distance $D_{layup}$. The first deformation device 80 is configured to increase the distance between the first mould edge and the second mould edge, e.g. as illustrated in FIG. 5 by pulling or moving the first mould edge 82 in a first direction indicated by arrow 86 away from the second mould edge 84. The first deformation device 78 comprises a first part 88 that is attached or anchored to a first side part 90 of the first mould frame 72. Further, a second part 92 of the first deformation device 78 is attached or anchored to the mould shell within 1 m from the first end of the mould shell 74.

The blade mould 70 and deformation assembly comprises a second deformation device 94 attached to a second side 95 of the mould shell 74 within 0.5 m from the first end of the mould shell for deforming the root end mould part 78 of the mould shell 74. The second deformation device 94 is configured to increase the distance between the first mould edge 82 and the second mould edge 84, e.g. as illustrated in FIG. 5 by pulling or moving the second mould edge 84 in a second direction indicated by arrow 96 away from the first mould edge 82. The second deformation device 94 comprises a first part 98 that is attached or anchored to a second side part 100 of the first mould frame 72. Further, a second part 102 of the second deformation device 94 is attached or anchored to the mould shell within 1 m from the first end of the mould shell 74.

Preferably, the blade mould 70 is configured such that the first parts 88, 98 are fixed (i.e. do not move) during deformation of the mould shell 74 and/or such that the second parts 92, 102 are moved, e.g. in opposite directions, during deformation of the mould shell 74.

The first deformation device 80 has a first travelling distance D1 of at least 5 mm, such as at least 10 mm or at least 20 mm. Thus, the first deformation device 80 is configured to move the first mould edge to allow free insertion of the root insert into the root end mould part of the mould shell.

The second deformation device 94 has a second travelling distance D2 of at least 5 mm, such as at least 10 mm or at least 20 mm. Thus, the second deformation device 94 is configured to move the second mould edge to allow free insertion of the root insert into the root end mould part of the mould shell.

Figure 6:
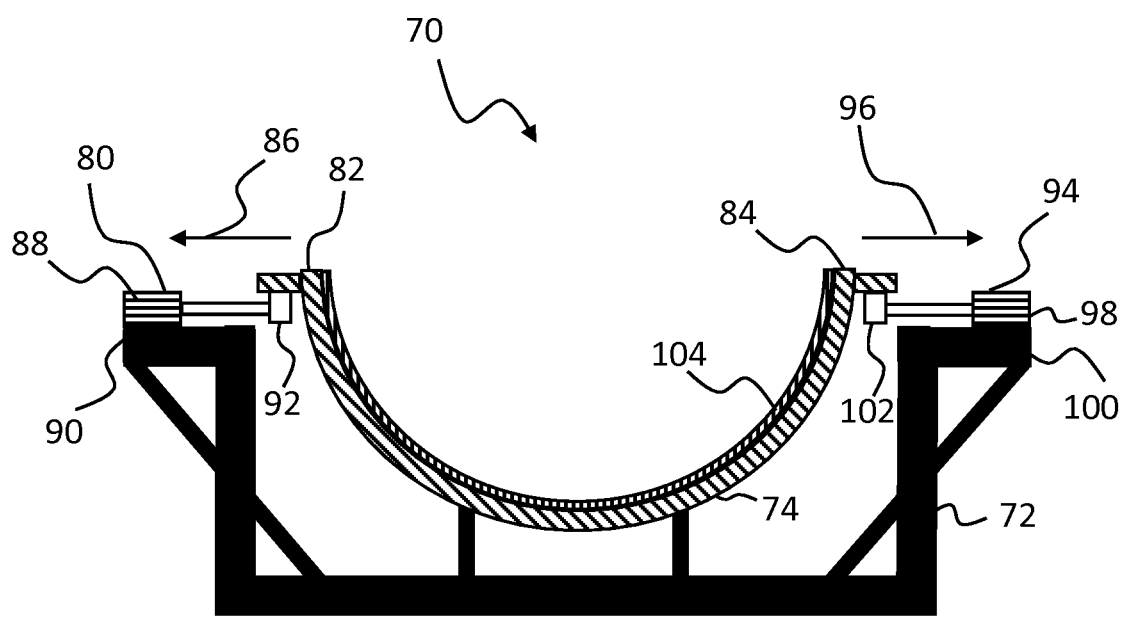

FIG. 6 shows a schematic end view of a blade mould in a receiving configuration. Reinforcement material/fibre mats 104 have been arranged on the moulding surface of the root end mould part and the root end mould part has been deformed to the receiving configuration by the first deformation device 80 and the second deformation device 94. Reinforcement material/fibre mats 104 may be arranged on the moulding surface of the root end mould part prior to, during and/or after deformation of the root end mould part. The first deformation device 80 has pulled or moved the first mould edge 82 in the first direction 86 and the second deformation device 94 has pulled or moved the second mould edge 84 in the second direction 96 to increase the mould edge distance $D_{edge}$ between the first mould edge 82 and the second mould edge 84. In the receiving configuration, the mould edge distance $D_{edge}=D_{receive}$, where $D_{receive}$ may be larger than the mould edge distance $D_{layup}$ in the layup configuration. The mould edge distance $D_{edge}$ has been increased by at least 40 mm to allow positioning of a root insert in the root end mould part of the mould shell. Accordingly, $D_{receive}-D_{layup}>40$ mm.

FIG. 7 shows a schematic end view of a blade mould in the receiving configuration. A root end insert 106 has been inserted and is kept in the root end mould part of the mould shell by means of a root end plate (not shown). The reinforcement material/fibre mats 104 are arranged between the moulding surface of the root end mould part and the root end insert 106. The mould edge distance $D_{receive}$ in the receiving configuration provides air gaps, clearance, or at least reduced friction between the root end insert 106 and reinforcement material arranged along the moulding surface of the first side 81 and the second side 95 of the mould shell 74. Thereby, the root insert can be inserted into the root end mould part with reduced risk of the reinforcement material wrinkling or being dragged by the root end insert towards the bottom of the root end mould part.

Upon insertion of the root end insert, the root end mould part is brought to a moulding configuration as shown in FIG. 8 by decreasing the mould edge distance to $D_{mould}$.

FIG. 8 shows a schematic end view of a blade mould in the moulding configuration. The first mould edge 82 and the second mould edge 84 have been moved towards each other by the first deformation device 80 and/or the second deformation device 94 to reduce the mould edge distance. The mould edge distance $D_{mould}$ in the moulding configuration is larger than the mould edge distance $D_{receive}$ in the receiving configuration. In the illustrated blade mould, $D_{mould} - D_{receive} > 40$ mm, such as about 50 mm.

FIG. 9 shows a schematic end view of a blade mould for manufacturing a blade shell part of a wind turbine blade in a layup configuration. The blade mould 70A has a single deformation device being the first deformation device 80. The second mould edge 84 is anchored to the second side part 100 of the first mould frame, such that the mould edge distance increases by pulling the first mould edge 82 in the first direction 86. Supporting legs 99 of the first mould frame may be configured to slide sideways, e.g. by means of a wheeled arrangement to facilitate distribution of the mould shell deformation on the mould shell.

It is not shown, but the root end insert 106 may for instance comprise a plurality of bushings and intermediate inserts, such as pultruded butterfly wedges, arranged on a root end flange. The root end insert 106 may additionally comprise reinforcing fibre material or the like.

The invention has been described with reference to preferred embodiments. However, the scope of the invention is not limited to the illustrated embodiments, and alterations and modifications can be carried out without deviating from the scope of the invention that is defined by the following claims. The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
15 tip end section
16 blade root
17 root end face
18 leading edge
20 trailing edge
22 pitch axis
24 pressure side blade shell part/upwind blade shell part
26 suction side blade shell part/downwind blade shell part
28 bond lines
29 horizontal
30 root region
32 transition region
34 airfoil region
50 airfoil profile
52 pressure side/upwind side
54 suction side/downwind side
56 leading edge
58 trailing edge
60 chord
62 camber line/median line
70 blade mould
72 first mould frame
71 mould shell
76 moulding surface
78 root end mould part
80 first deformation device
81 first side
82 first mould edge
84 second mould edge
86 first direction
88 first part
90 first side part
92 second part
94 second deformation device
95 second side
96 second direction
98 first part
99 support leg
100 second side part
102 second part
104 reinforcement material
106 root end insert
c chord length
$d_t$ position of maximum thickness
$d_f$ position of maximum camber
$d_p$ position of maximum pressure side camber
f camber
$l_f$ longitudinal distance between root end frames
$l_o$ longitudinal extent of blade tip overhang
L blade length
r local radius, radial distance from blade root
t thickness
D blade root diameter
$\Delta y$ prebend
X longitudinal axis

The invention claimed is:

1. A blade mould for manufacturing a blade shell part of a wind turbine blade, the blade shell part extending from a tip end to a root end, wherein the blade mould comprises:
    a first mould frame;
    a mould shell supported by the first mould frame and provided with a moulding surface that defines an outer shape of the blade shell part, wherein the mould shell has a longitudinal direction and comprises a root end mould part at a first end thereof; and
    a first deformation device attached to the first mould frame for deforming the root end mould part of the mould shell, wherein the mould shell has a first mould edge and a second mould edge, wherein the first deformation device is configured to increase a mould edge distance between the first mould edge and the second mould edge, and wherein the first mould frame is static such that deformation of the root end mould part of the mould shell is with respect to the first mould frame.

2. The blade mould according to claim 1, wherein the first deformation device is attached to the mould shell at a distance less than 2 meters from the first end of the mould shell.

3. The blade mould according to claim 1, wherein the first deformation device is attached to a first side of the mould shell or wherein the first deformation device is attached to a second side of the mould shell.

4. The blade mould according to claim 1, wherein the first mould frame comprises a first side part, and wherein the first deformation device is attached to the first side part.

5. The blade mould according to claim 1, wherein the first deformation device comprises a first part anchored to the first mould frame and a second part anchored to the mould shell.

6. The blade mould according to claim 5, wherein the first part of the first deformation device is fixed during deformation of the mould shell and the second part of the deformation device moves during deformation of the mould shell.

7. The blade mould according to claim 1, further comprising a second deformation device for deforming the root end mould part of the mould shell.

8. The blade mould according to claim 7, wherein the first mould frame comprises a second side part, and wherein the second deformation device is attached to the second side part.

9. The blade mould according to claim 7, wherein the second deformation device is attached to a second side of the mould shell.

10. The blade mould according to claim 1, wherein the first deformation device comprises an actuator selected from a telescopic piston cylinder, such as a hydraulic piston, a pneumatic piston, and an electric actuator.

11. The blade mould according to claim 1, wherein the moulding surface at the first end forms a part of a substantially half-circular or half-oval root end of the blade shell part.

12. A method of manufacturing a blade shell part of a wind turbine blade, wherein the blade shell part is manufactured as a composite structure comprising a reinforcement material embedded in a polymer matrix, and wherein the blade shell part is provided with a root end insert that, when manufactured, is accessible from a root end of the blade shell part, and wherein the blade shell part is manufactured in a mould shell provided with a moulding surface that defines an outer shape of the blade shell part, wherein the mould shell has a longitudinal direction and comprises a root end mould part at a first end thereof, the method comprising:
  arranging reinforcement material on a moulding surface of the root end mould part;
  deforming the root end mould part to a receiving configuration;
  inserting the root end insert in the root end mould part; and
  bringing the root end mould part to a moulding configuration.

13. The method according to claim 12, wherein deforming the root end mould part to a receiving configuration comprises increasing a mould edge distance between a first mould edge and a second mould edge of the mould shell.

14. The method according to claim 13, wherein increasing the mould edge distance between the first mould edge and the second mould edge of the mould shell comprises pulling the first mould edge and the second mould edge.

15. The method according to claim 12, wherein the step of arranging the reinforcement material on the moulding surface of the root end mould part is performed with the root end mould part in a layup configuration, the layup configuration corresponding to the moulding configuration.

16. The method according to claim 12, wherein bringing the root end mould part to a moulding configuration comprises reducing a mould edge distance between a first mould edge and a second mould edge of the mould shell.

17. The method according to claim 12, wherein the step of deforming the root end mould part to the receiving configuration comprises deforming the root end mould part with respect to a static mould frame.

* * * * *